United States Patent [19]

Goepfert et al.

[11] Patent Number: 4,721,351
[45] Date of Patent: Jan. 26, 1988

[54] METHOD AND APPARATUS FOR VARIABLE ATTENUATION OF AN OPTICAL WAVEGUIDE

[75] Inventors: Wolfgang Goepfert, Feldkirchen; Walter Proebster, Munich; Dieter-Josef Will, Pullach, all of Fed. Rep. of Germany

[73] Assignee: Siemens Aktiengesellschaft, Berlin and Munich, Fed. Rep. of Germany

[21] Appl. No.: 648,810

[22] Filed: Sep. 10, 1984

[30] Foreign Application Priority Data

Sep. 9, 1983 [DE] Fed. Rep. of Germany ....... 3332631

[51] Int. Cl.⁴ ............................................. G02B 6/26
[52] U.S. Cl. ...................................................... 350/96.15
[58] Field of Search ............... 350/96.15, 96.16, 96.20

[56] References Cited

U.S. PATENT DOCUMENTS

| | | | |
|---|---|---|---|
| 3,982,123 | 9/1976 | Goell et al. | 250/227 |
| 4,277,134 | 7/1981 | Upton, Jr. | 350/96.20 |
| 4,557,550 | 12/1985 | Beals et al. | 350/96.15 |

FOREIGN PATENT DOCUMENTS

| | | | |
|---|---|---|---|
| 2816846 | 10/1979 | Fed. Rep. of Germany | 350/96.15 |
| 2841133 | 4/1980 | Fed. Rep. of Germany | 350/96.15 |
| 2943843 | 5/1981 | Fed. Rep. of Germany | 350/96.15 |
| 138452 | 10/1979 | Japan | 350/96.15 |

OTHER PUBLICATIONS

"Curvature Loss Formula for Optical Fibers", Marcuse, J. Opt. Soc. Am., vol. 66, No. 3, Mar. 1976.
"Bends in Optical Dielectric Guides", Marcatili, Bell System Technical Journal, Sep. 1969.
"Analysis of Curved Optical Waveguides by Conformal Transformation, Heiblum et al., IEEE Journal of Quantum Electronics, vol. QE-11, No. 2, Feb. 1975.

*Primary Examiner*—William L. Sikes
*Assistant Examiner*—Frank Gonzalez
*Attorney, Agent, or Firm*—Hill, Van Santen, Steadman & Simpson

[57] ABSTRACT

A method and apparatus for variable attenuation of a flexible optical waveguide empart a variable curvature to the waveguide such that selected, conditioned radiation losses result. In one embodiment the curvature is emparted by winding a portion of the waveguide around a grooved roller, in other embodiments the curvature is emparted by slides which are laterally moveable within curved recesses of a supporting frame, the slides engaging the waveguide and causing the waveguide to conform to varying portions of the curved recesses.

18 Claims, 19 Drawing Figures

METHOD AND APPARATUS FOR VARIABLE ATTENUATION OF AN OPTICAL WAVEGUIDE

BACKGROUND OF THE INVENTION

Field of the Invention

The present invention relates to methods and devices for obtaining variable optical attenuation of a waive guide, and in particular to such methods and apparatus which cause radiation losses by selected curving of the waveguide.

Optical attenuation means making use of so-called fiber offset losses are known wherein two glass fibers are arranged with their respective end faces offset relative to one another. Adjustment of attenuation means of this type requires considerable technical outlay.

Other types of optical attenuation means are known which operate on the principal of absorption attenuation in imaging optical systems. Such attenuation means also typically require considerable technical outlay.

Attenuation means of the type described above all require as a condition for operation an enlargement of the fiber distance or line, which involves unavoidable additional signal losses.

SUMMARY OF THE INVENTION

It is an object of the present invention to provide a method and apparatus for variable optical attenuation of a flexible waveguide which achieve such attenuation without difficult adjustment and without the need for imaging optical systems.

It is a further object of the present invention to provide such a method and apparatus which achieves exact and reproducable optical attenuation.

Another object of the present invention is to achieve such a method and apparatus which permits continuous adjustment from zero upwards.

Another object of the present invention is to provide such a method and apparatus which operates on a closed monomode optical waveguide.

The above objects are inventively achieved in a method and apparatus wherein a flexible monomode optical waveguide of specified length is guided in a defined manner around a means for imparting a variable curvature to the waveguide such that selected curvature-conditioned radiation losses result. An increasing curvature or curvature length of the waveguide increases such curvature-conditioned losses. Guidance of the monomode fiber which may, for example, be a glass fiber with cladding, may be varied constantly or in stages or steps. When the monomode fiber is guided in a mechanically curved fashion, defined attenuation values can be continuously adjusted.

The method and apparatus thus achieve a desired variable optical attenuation of a waveguide which requires only a means for variably spatially guiding the monomode fiber. Virtually no additional noise is introduced, therefore no noise-conditioned sensitive loss of the waveguide occurs.

The general theory of radiation losses caused by curving monomode fibers is described, for example, in "*Curvature Loss Formula For Optical Fibers*", Marcuse, J. Opt. Soc. Am., Vol. 66, No. 3, March 1976; "*Bends in Optical Dielectric Guides*", Marcatili, Bell System Technical Journal, September 1969; and "*Analysis Of Curved Optical Waveguides By Conformal Transformation*", Heiblum et al., IEEE Journal of Quantum Electronics, Vol QE-11, No. 2, February 1975.

The above articles consider this physical effect from the point of view that a attenuation and losses connected therewith are disadvantageous and should be avoided if possible. In contrast, the method and apparatus disclosed in claim herein advantageously exploit such radiation losses for achieving selected attenuation. Investigation has shown that conventional monomode fibers can withstand the mechanical demands associated with such curvature-induced attenuation in the context of the present method and apparatus. In accordance therewith, the curvature of the glass fiber may be varied along its entire length, or along only a portion of its length.

In one simplified embodiment of the method and apparatus a portion of the optical waveguide is subjected to a uniform curvature, with variable attenuation being achieved by causing an increased portion of the optical waveguide to conform to this uniform curvature.

In a further embodiment of the method and apparatus, a least a portion of the optical waveguide is subjected to a curvature or a radias of curvature which is variable.

In all embodiments, in order to achieve as precise an attenuation as possible, an optical waveguide should be employed which can assume substantially the same curvature as the mechanical guidance means. A fixed mechanical connection to the entire optical waveguide, in particular to the waveguide cross-section serves this purpose. Waveguides which are blank or solidly extrusion-coated fibers, preferably solidly extrusion-coated monomode fiber pigtails, are preferably employed.

Attenuators practicing the method and apparatus disclosed herein may be utilized in measuring arrangements for examining optical monomode light waveguide transmission systems, or as artificial extension lines.

The length of the optical waveguide is preferably selected such that the waveguide functions as a connection line, for example, between the transmitter or receiver and a first system-conditioned detachable interface.

In one embodiment of the apparatus, at least a portion of the optical waveguide is wound on a winding member. By winding an increased portion of the waveguide around the winding member, attenuation results to a selected degree. The winding element may have spindles rotatable in opposite directions and disposed on both sides of a supporting structure for reporting a loop of the optical waveguide.

The radius of curvature, in the axial direction of the spindles, may have various values corresponding to the desired characteristics of the optical attenuator. The spindle may thus be symmetrical or asymmetrical in relation to the central support of the optical waveguide. Upon winding of the optical waveguide on the spindle, the overall attenuation can be adjusted by adjusting the rotation angle of the spindle.

In another embodiment of the invention, the winding member is a double-threaded spindle with a constant radius of curvature. In this embodiment, the overall attenuation increases in a linear manner as the spindle is rotated and is thus directly adjustable by adjusting the rotational angle. The linear attenuation as a function of the rotational angle has an increasing gradient which is slightly dependent upon the wave length of the transmitted light, as well as upon the fiber properties, but is largely independent of temperature. Of particular advantage in this embodiment is the high stability of the adjusted attenuation over long term operation.

The two ends of the optical waveguide are preferably guided in a guide means also operably consistently with the winding member. The free ends of the optical waveguide may be supplied to the winding member tangentially and in parallel.

The guide device preferably includes a guide assembly, in the form of a double-spindle, a guide roller. By mounting the guide roller such that its distance relative to the guide assembly can be altered or adjusted, the tension of the optical wave guide during winding on the winding member can be adjusted. Additionally, by rotating the guide roller, the optical wave guide can be unwound from the winding member. A certain tension of the optical waveguide guarantees particularly low tolerances of the attenuation through the rotational angle.

In another embodiment of the invention, the waveguide is guided by means of at least one guide member having a semicircular shape such that a portion of the waveguide is pushed against the circumference of the guide member and conforms to the shape thereof.

Another embodiment of the apparatus includes a return device such that a portion of the waveguide entering the return device can be attenuated by causing that portion of the waveguide to conform to a serpentine surface of a guide element by means of a generally circular moveable slide which forces the waveguide into engagement with the surface, and the portion of the waveguide exiting from the return device can also be displaced in the opposite direction by a substantially mirror-image unit. The radius of the adjustment disk slideable transversely with respect to the waveguide specifies the maximum adjustable curvature radius. This embodiment is particularly useful as an extension line.

The optical waveguide may be tensioned by means of the return device.

In another embodiment of the invention the serpentine surface of the guide element may be formed by one or more rotatable disks disposed in sequence with the transversely slideable disks movable therebetween. The embodiment has the advantage that the attenuation, proceeding from a small minimum value, can be altered within a relatively large range in an approximately linear fashion by displacement of one guide roller.

In another embodiment suitable for use as an optical extension line, a support means including an arrangement of several guide members, in the form of cylindrical journals, and further including locking devices for supporting the waveguide is provided. The cylindrical journals are disposed on a rectangularly shaped support in rows and columns, and the locking means are disposed on the exterior of the support substantially centrally between two adjacent rows or columns.

For monomode optical waveguides transmitting light having a wave length in a range of approximately 1275 nm through approximately 1310 nm, suitable attenuation can be achieved by varying the diameter of curvature in the range of approximately 18 to 23 mm.

DESCRIPTION OF THE PREFERRED EMBODIMENTS

Figure 1:
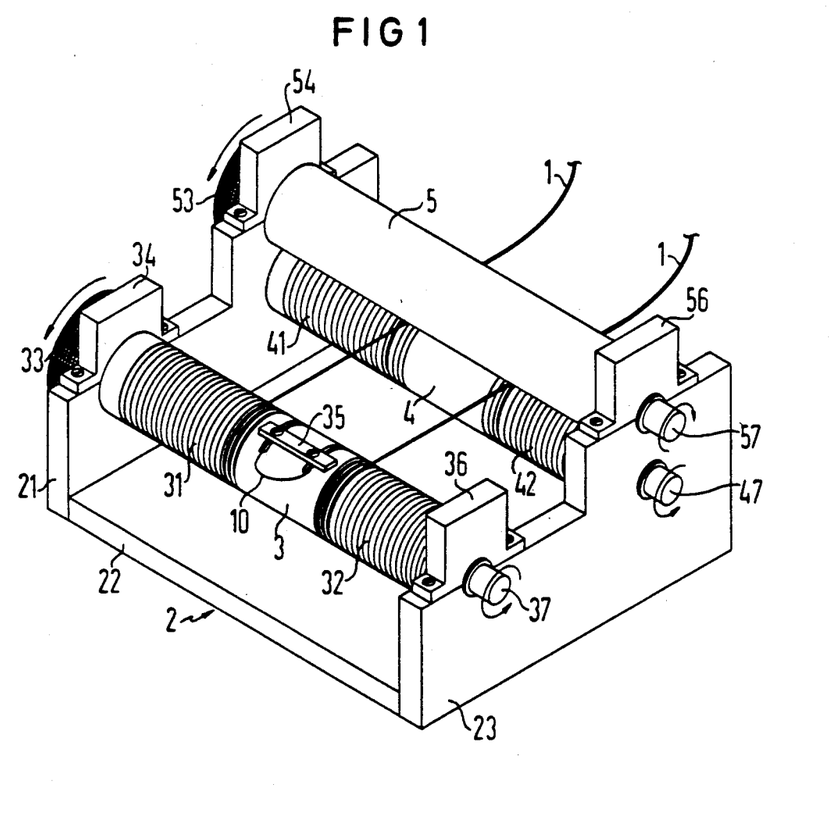
FIG. 1 is a prospective view of an optical wave guide attenuator constructed in accordance with the principals of the present invention.

A first embodiment of an optical attenuator constructed in accordance with the principals of the present invention is shown in FIG. 1 for imparting selected attenuation to a flexible optical waveguide 1.

The optical attenuator has a supporting frame 2 having a base 22 and two vertical walls 21 and 23. The frame 2 supports an attenuation spindle 3 having a shaft 37 received in bearing brackets 34 and 36 connected to the walls 21 and 23. The shaft 37 has an operating knob 33 at one end thereof in the form of a circular disk.

The attenuation spindle 3 has a central portion with a clamp 35 attached thereto for clamping a loop 10 of the optical waveguide 1. The outer portions of the attenuation spindle 3 are provided with spiral grooves running in the manner of a right-hand thread 31 and a left-hand thread 32.

The free ends of the optical waveguide 1, disposed on both sides of the loop 10, are respectively guided by means of a guide or feed spindle 4 and a guide roller 5.

The guide spindle 4 has a shaft 47 rotatably received in the walls 21 and 23, and the guide roller 5 has a shaft 57 received in bearing brackets 54 and 56 connected to the walls 21 and 23. The guide roller 5 has a circular operating knob 53 connected to one end of the shaft 57.

The free ends of the optical waveguide 1, disposed on both sides of the looped end, are respectively received in guide grooves 41 and 42 disposed at outer portions of the guide spindle 4 so as to cause the free ends of the waveguide 1 to tangentially approach the attenuation spindle 3 in parallel. Rotation of the attenuation spindle 3 in the direction of the arrow causes the two ends of the optical waveguide to be wound on the spindle 3.

In order to increase attenuation, the operating knob 33 is rotated further in the direction of the arrow. Tension which stretchs or strains the optical waveguide 1 results from the contact pressure provided by the guide roller 5.

In order to reduce attenuation, the operating knob 53 is rotated in the direction of the arrow. The guide roller 4 entrains the optical waveguide 1, projecting slightly from the guide grooves 41 and 42, and slightly unwinds it from the attenuation spindle 3. In order to maintain the optical waveguide 1 stretched under such conditions, the bearing for the shaft 37 of the attenuation spindle 3 may be mounted with a certain friction or may have a breaking device associated therewith. The guide spindle 4 consists, at least on its surface, of a material which is suitable for entraining the optical waveguide, such as an elastic material, preferably rubber. In addition, it is preferable that the cladding of the optical waveguide 1 have a surface which ensures a certain adhesion to the guide spindle 4.

In some applications, which require attenuation of less precision, such as in the case of an extension line, the guide assembly consisting of the guide spindle 4 and the guide roller 5 may be omitted.

It is also within the scope of the subject matter disclosed and claimed herein to mechanically couple the shafts 37, 47, and 57 by suitable gearing or by toothed reeled rims so as to be able to simultaneously drive those shafts by means of a drive unit. If a motor-controlled regulated drive is employed, the tension can be controlled by means of slip disks attached to the shafts 37 and 47.

In order to achieve exact reproducability of the attenuation, the attenuator shown in FIG. 1 can readily be calibrated such that the progression of the attenuation is measured by the rotational angle of the attenuation spindle 3. If the attenuator shown in FIG. 1 is to be utilized with an automatic control means, this attenuation progression may be entered into a memory, the memory being utilized for controlling subsequent operation of the attenuator, such that small attenuation values can be adjusted in a specified manner.

Figures 2, 3, 4, 5:
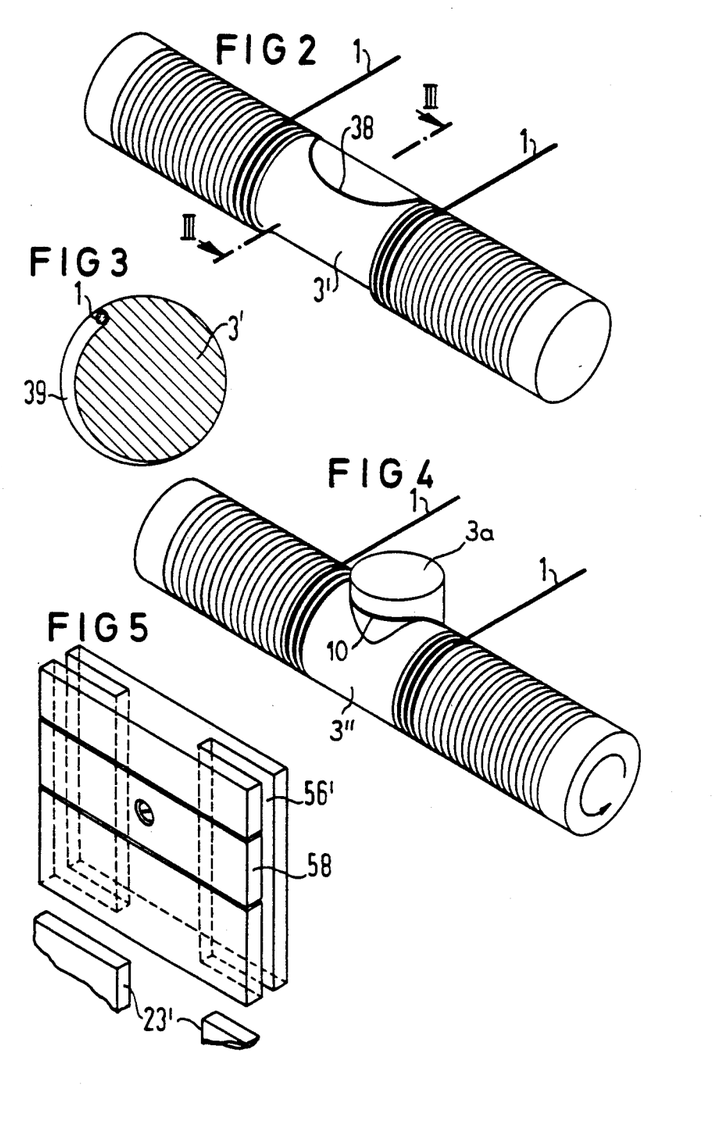
FIG. 2 is a prospective view of a double-threaded spindle for use in the apparatus shown in FIG. 1.
FIG. 3 is a sectional view of the spindle shown in FIG. 2 taken along line III—III.
FIG. 4 is a prospective view of a further embodiment of a double-threaded spindle for use in the apparatus shown in FIG. 1.
FIG. 5 is an alternative embodiment for a support mount for the feed roller for the apparatus shown in FIG. 1.

Another embodiment of a guide spindle for use in the attenuator shown in FIG. 1 is shown in FIG. 2, which does not require the clamp 35. The spindle 3' shown in FIG. 2 has a curved guide groove 38 connecting the outer spiral guide grooves. A loop of the waveguide 1 can be inserted in the groove 38 and secured therein, such as by cementing with a suitable adhesive. In order to achieve a basic beginning attenuation which is as low possible, the guide groove 38 (as well as the loop 10 in the embodiment shown in FIG. 1), should have a radius of curvature which is as large as possible.

The attenuation spindle 3' is shown in sectional view in FIG. 3 showing how the guide groove 38, containing the waveguide 1, merges into a first flight 39 of one of the spiral threads.

A further embodiment 3" of the attenuators spindle is shown in FIG. 4, this embodiment having a cam 3a disposed in a center thereof, about which the loop 10 of the waveguide 1 is formed.

A modified bearing bracket 56' is shown in FIG. 5 which permits vertical movement of the guide roller 5 with respect to the guide spindle 4 so as to permit adjustment of the contact pressure in the nip formed between those rolls. The modified bearing bracket 56', when viewed from above, has an H-profile and is received in a recess 23' in the wall 23 so as to be vertically slideable therein. Once adjusted, the position of the bracket 56' can be fixed by tightening a clamp 58.

Figure 6:
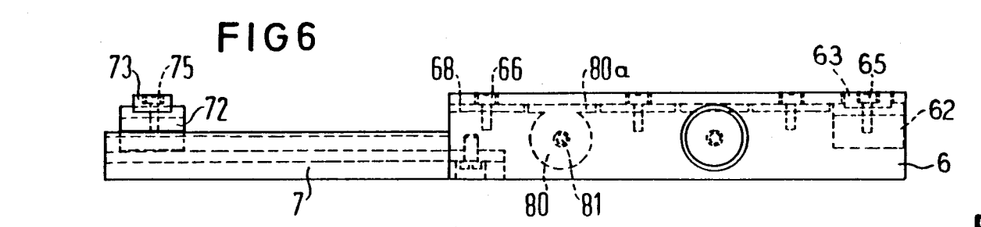
FIG. 6 is a side view of another embodiment of an optical attenuator constructed in accordance with the principals of the present invention having laterally adjustable disk-shaped slides.
Figure 7:
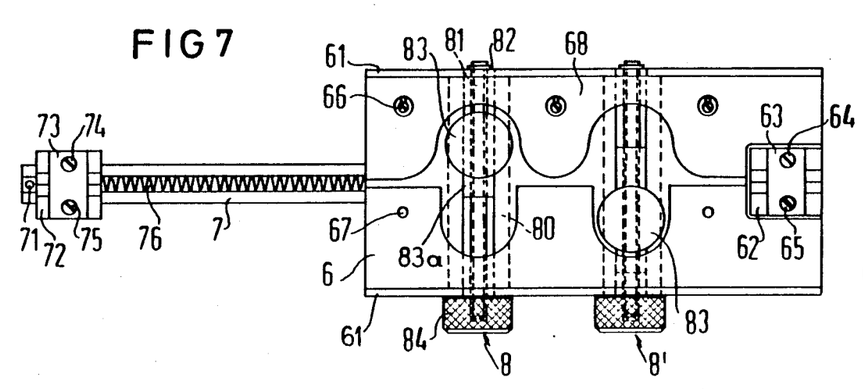
FIG. 7 is a top plan view of the embodiment shown in FIG. 6.
Figure 8:
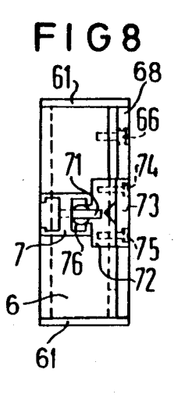
FIG. 8 is an end view of the apparatus shown in FIG. 6.

Another embodiment of an attenuator construction in accordance with the principles of the present invention is shown in side, top and end views in FIGS. 6 through 8. In this embodiment, the waive guide is subjected to a curvature along several portions of its lenght. By the use of two curvature slides as shown in this embodiment, an attenuation of two times 10 dB can be obtained.

The embodiment of FIGS. 6 though 8 has a generally rectangular supporting base 6 which has two pairs of communicating recesses 80 and 80a extending transversely therethrough. The term transversely as used herein means substantially perpendicular to the longest dimension of the support base 6. The waveguide, although not shown in FIGS. 6 through 8, extends through the attenuator along this longest dimension.

The support base 6 is provided with two side covers 61 each of which have smaller diameter recesses for receiving a threaded axle 81, which extends through the recess 80 in the support base 6. The threaded axle 81 is held at one end by a snap washer 82 and has a knob 84 at its opposite end.

A slide 83a having an interior threaded bore through which the threaded axle 81 extends has a disk 83 attached thereto. Rotation of the knob 84 causes rotation of the axle 81, in turn displacing the slide 83a such that the disk 83 moves transversely within the recess 83a. The axle 81, the slide 83a and the disk 83 comprise an adjustment assembly 8. The attenuator is provided with another adjustment assembly 8' consisting of identical elements.

The upper surface of the support base 6 has a serpentine recess therein into which the disks 83 are movable. The recesses have a curved segment therebetween providing a continuous curved path.

A return device is provided at one end of the attenuator connected to the support base 6. The return device includes a channel 7 having a coil spring 76 received therein having a free end connected to a slide 72. The coil spring 76 normally urges the slide 72 away from the support base 6, movement of the slide 76 being limited by a pin 71. The slide 72 has a cross-section in the form of a double-U for receiving a waveguide loop. The waveguide is held within the slide 72 by a clamp 73 attached thereto by a screws 74 and 75.

The opposite end of the support base 6 has another clamping device 62, of similar cross-section, with a clamp 63 held thereon by screws 64 and 65.

The support base 6 is covered by a cover plate 68 comprised of transparent material. The cover plate 68 is held to the support base 6 by screws 66 received in slots which permit adjustment of the cover plate 68 to accommodate different thicknesses of waveguide. Locating pins 67 also assist in positioning the cover 68 with respect to the support base 6.

The waveguide enters the attenuator through the clamping assembly 62 and is guided along the serpentine recess in the support base 6. The waveguide is deflected by a selected amount by rotation of the knobs 84 for the attenuation assemblies 8 and 8', causing one or both of the disks 83 to engage the wageguide and impart a greater or less curvature to the waveguide in the form of an S-curve. The waveguide is to be exposed to as low a tentile stress as possible, therefor the attenuation 8 and 8' are preferably actuated in a specified sequence with decreasing distance from the return device. In the embodiment shown in FIGS. 6 through 8, the right assembly 8' is the first to be deflected and the last to be reset.

The disks 83 are of a material such as plastic which permits the optical waveguide to slide along the circumference thereof. In order to reduce the friction of the waveguide, the disks 83 may be rotatably mounted on the slides 83a.

Figure 9:
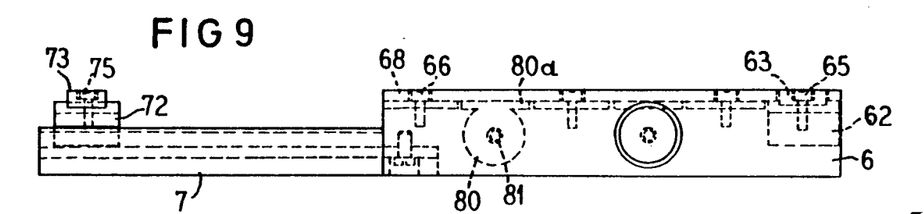
FIG. 9 is a side view of another embodiment of an optical attenuator constructed in accordance with the principals of the present invention having laterally adjustable disk shaped slides and a supporting frame having disk shaped rollers.
Figure 10:
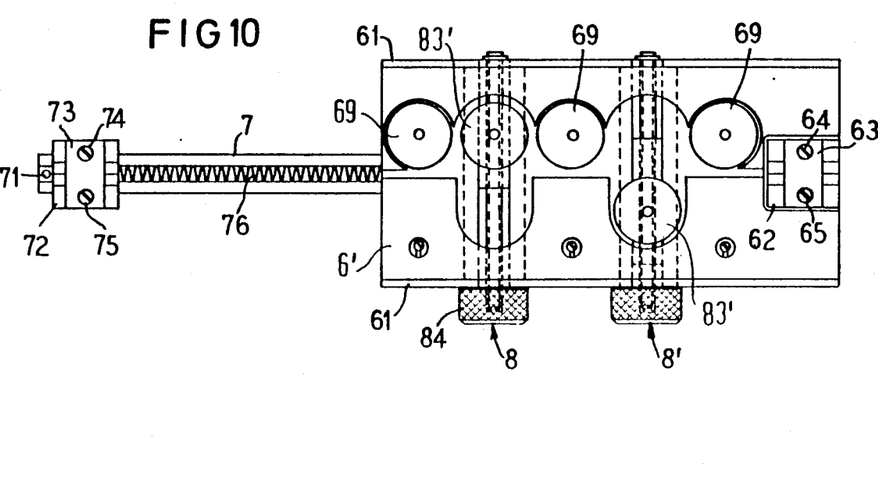
FIG. 10 is a top plan view of the apparatus shown in FIG. 9.
Figure 11:
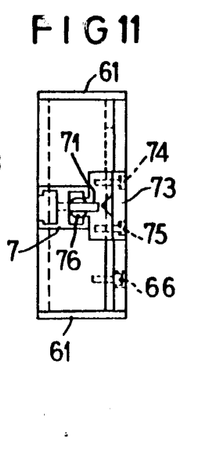
FIG. 11 is an end view of the apparatus shown in FIG. 9.

An embodiment showing such pivotally mounted disks 83' is shown in FIGS. 9 through 11. This embodiment also employs rotatable disks 69 mounted on the upper surface of the support base 6' and against which the waveguide slides as it longitudinally moves through the attenuator. In this embodiment, the lower portion of the support base 6' is provided with adjustable screws 66. Components corresponding to those already identified in connection with FIGS. 6 through 8 have been provided with the same reference numerals.

Figures 12, 15:
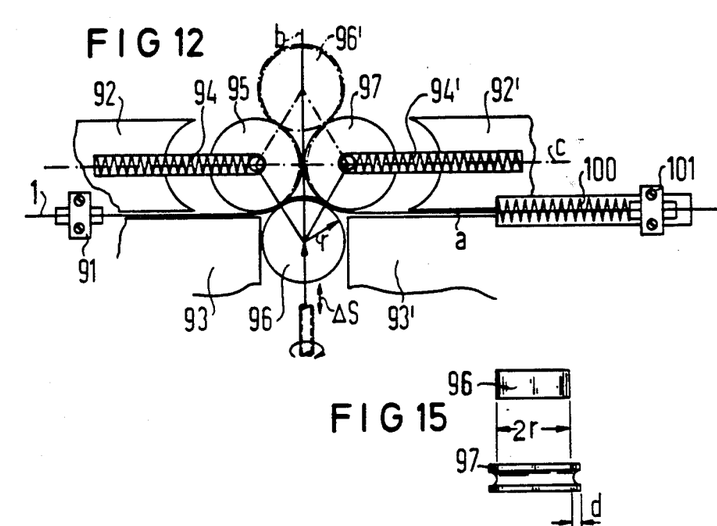
FIG. 12 is a plan view of a portion of an optical attenuator constructed in accordance with the principals of the present invention having adjustable guide rollers.
FIG. 15 is an enlarged side view of the guide rollers for use in the apparatus shown in FIGS. 12-14.

A further embodiment of an attenuator constructed in accordance with the principals of the present invention is partially shown in FIG. 12. In this embodiment the optical waveguide 1 is deflected by a guide roller 96 from a normal straight line a, the waveguide 1 being normally urged along this straight line by a coil spring 100 between clamping devices 91 and 101. The waveguide 1 is guided in a loop by three displaceably mounted guide rollers, 95, 96 and 97.

The guide roller 96 is mounted so as to be movable along a straight line b. The shafts of the guide rollers 95 and 97 are mounted so as to be displaceable relative to each other along a straight line c, which is perpendicular to the line b.

The guide rollers 95 and 97 are normally urged toward each other by respective springs 94 and 94' which are part of support elements 92 and 92' disposed on opposite sides of the rollers 95 and 97. The guide roller 96 may be displaced by means of a threaded rod similar to that described in the earlier embodiments (not shown in FIG. 12) along the straight line b. The guide roller 96 is thus movable between the rollers 95 and 97 and forces those rollers apart against the action of the springs 94 and 94'. When forced apart, the respective circumferences of the rollers 95 and 97 move along the straight line a The optical waveguide 1 extends between the support mountings 92 and 92' and guide elements 93 and 93' on both sides of the guide roller pair 95 and 97 along the straight line a. The waveguide 1 is also guided around the circumference of the roller 96. If the roller 96 is in the position indicated by the solid line in FIG. 12, the waveguide is reflected out of the straight line a in the manner of a wavecrest such that the crest is determined by the guide roller 96 and the wavetroughs are determined by the guide rollers 95 and 97. At the other extreme position 96', indicated by dashed lines in FIG. 12, the guide roller 96' is disposed centrally with respect to the guide rollers 95 and 97. The optical waveguide 1 winds around approximately 5/6 of the circumference of the guide roller 96' and engages approximately 5/12 of the circumferences of the guide rollers 95 and 97.

Attenuation occurs according to an archtangent dependency and is approximately proportional to the path $\Delta S$ along which the guide roller 96 moves, and is therefor also approximately proportional to the number of revolutions of the threaded rod which moves the guide roller 96. The portion of the optical waveguide 1 subjected to a curvature corresponding to the radius r of the guide rollers 95, 96 and 97 may be altered between a minimum value corresponding to the length $2\pi r/3$ and a maximum value corresponding to the length $10\pi r/3$.

Figure 13:
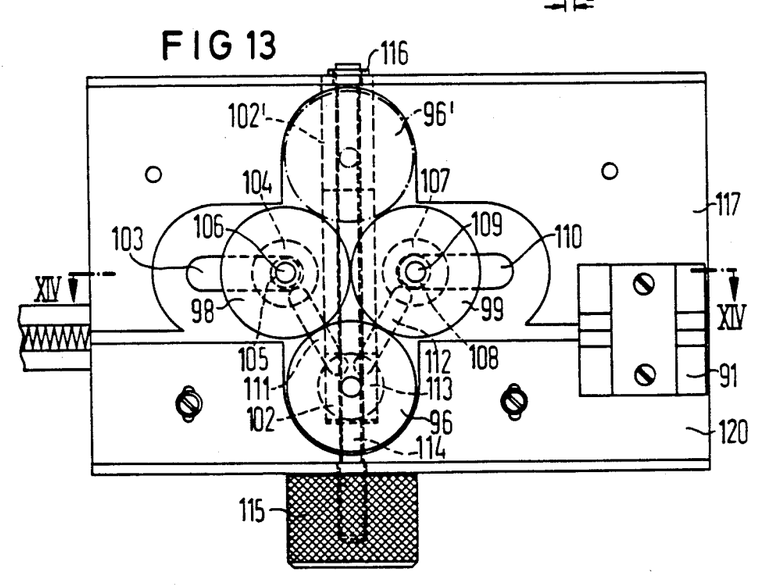
FIG. 13 is a top plan view of a further embodiment of the apparatus shown in FIG. 12.
Figure 14:
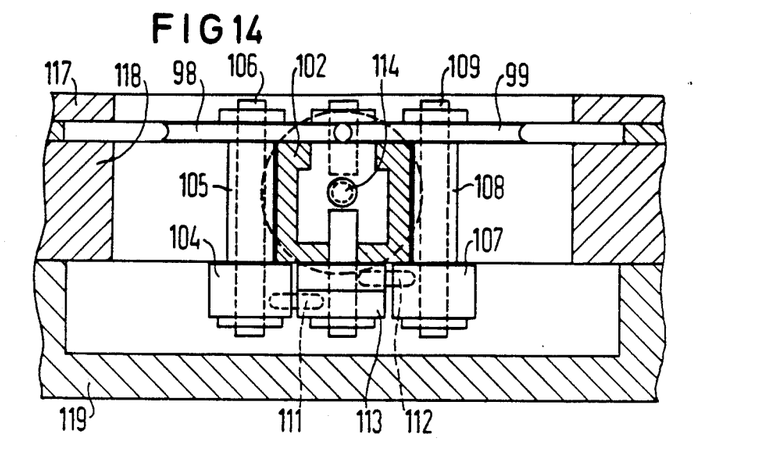
FIG. 14 is a sectional view of the embodiment shown in FIG. 13 taken along line XIV—XIV.

Further details of an attenuator constructed along the lines of FIG. 12 are shown in FIGS. 13 and 14. In FIGS. 13 and 14, the reference symbol 96 refers to the centrally disposed guide roller, as in FIG. 12, and the remaining two guide rollers, corresponding to guide rollers 95 and 97 in FIG. 12, are referenced 98 and 99 in FIG. 13. The guide rollers 96, 98 and 99 are disposed so as to be in circumferential contact. The relative movement of the guide rollers is as described in connection with FIG. 12.

The guide roller 96 is supported on a slide 102 which is moveable in a guide groove along a straight line in a upper frame comprised of elements 117 and 118 (shown in FIG. 14). The slide 102 (and the roller 96) are caused to move within the guide slot by rotation of a threaded axle 114 by means of a knob 115. The opposite end of the axle 114 is affixed by a snap ring 116. The rollers 98 and 99 are mounted on respective vertical shafts 106. The shaft 106 has a roller 105 thereon movable within a slot 103 in the frame elements 117 and 118, and the shaft 109 has a similar roller 108 moveable with a slot 110. Additionally, the roller 106 terminates in an abutment 104 engaging a spreading rod 111 mounted on a carrier 113 below the slide 102. Similarly, the shaft 109 terminates in an abutment 107 engaging another spreader rod 112 connected to the carrier 113. The abutments 104 and 107 and the carrier 113 are disposed in a recess formed by a bottom frame member 119.

As shown in FIG. 13, the attenuator has a clamping means 91 disposed at one side thereof and a turning device, only a portion of which can be seen in FIG. 13, which is the same as shown in the embodiments of FIGS. 6 through 11. The waveguide enters the attenuator through the clamping device 91 and curves around the surface of the roller 96 and is returned by means of the return device. As the knob 115 is rotated, the slide 102 and the roller 96 are caused to move between the rollers 98 and 99, the spreader rods 111 and 112 causing those rollers to move apart. An extreme position 102' for the slide and 96' for the roller is shown in FIG. 13, at which position the waveguide forms a complete loop around the roller.

The attenuator of FIG. 13 is covered with a cover plate 120.

The guide rollers 95 and 97 in the embodiment of FIG. 12 (and 98 and 99 in the embodiment of FIG. 13) have a groove as shown in FIG. 15 (only roller 97 being shown therein). The inner diameter of the roller 97 is equal to the diameter (2r) of the roller 96. The depth d of the groove is at least equal to the maximum diameter of the optical waveguide, for example, approximately 2 mm.

Figure 16:
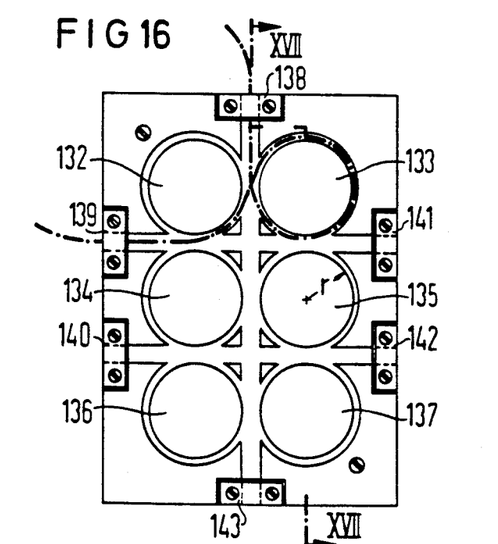
FIG. 16 is a plan view of a futher embodiment of an optical attenuator constructed in accordance with the principals of the present invention for use as an extension line with selectable attenuation.
Figure 17:
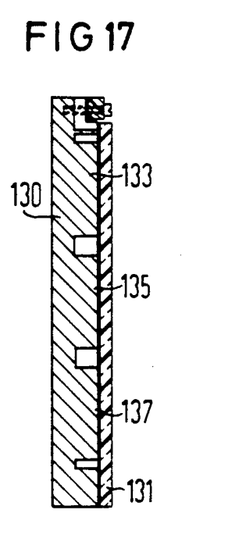
FIG. 17 is a sectional view of the embodiment shown in FIG. 16 taken along line XVII—XVII.

The embodiment shown in FIGS. 16 and 17 is particularly suitable for use as an extension line. In this embodiment, a 1-piece molded element 130 has a plurality of molded disks 132, 133, 134, 135, 136 and 137 thereon arranged in two columns and three rows. At the edge of the element 130 are recesses at which clamping devices 138, 139, 140, 141, 142 and 143 are located. The optical waveguide is mounted at one of these clamping devices at the respective entry and exit points of the element 130.

The clamping devices 138 and 143 are centrally disposed along the narrower edges of the element 130, with a recess extending therebetween esentially dividing the element 130 in half. The clamping devices 139 and 141 are disposed on opposite sides of the element 130, as are the clamping devices 140 and 142, with recesses extending between those respective pairs of clamping devices bounded on each side by one of the disks.

Between any two oppositely disposed clamping means, therefore, a path for the waveguide exists, and between any two adjacent disks there exists a region at which the guide grooves intersect. After the waveguide has been inserted in the guide grooves and wound around as many of the disks as needed, the unit may be covered by a cover plate 131.

It is also possible to manufacture the embodiment shown in FIG. 16 with the disks 132 through 137 simply projecting upwardly from a base plate, in which case guide grooves are not necessary.

By guiding the optical waveguide around as many of the disks as needed, attenuation can be adjusted in increments corresponding to multiples of $\pi r/2$, where r is the radius of the disks 132 through 137. In the embodiment shown in FIG. 16, wherein the waveguide is indicted by the broken line, attenuation amounts correspond to a curvature length of $5\pi r/2$.

In order to achieve different attenuation values, the radius r may be varied within a permissable range $r_{min} \leq r \leq r_{max}$. The number of disks may be reduced or expanded depending upon the amount of attenuation needed for particular applications.

Figure 18:
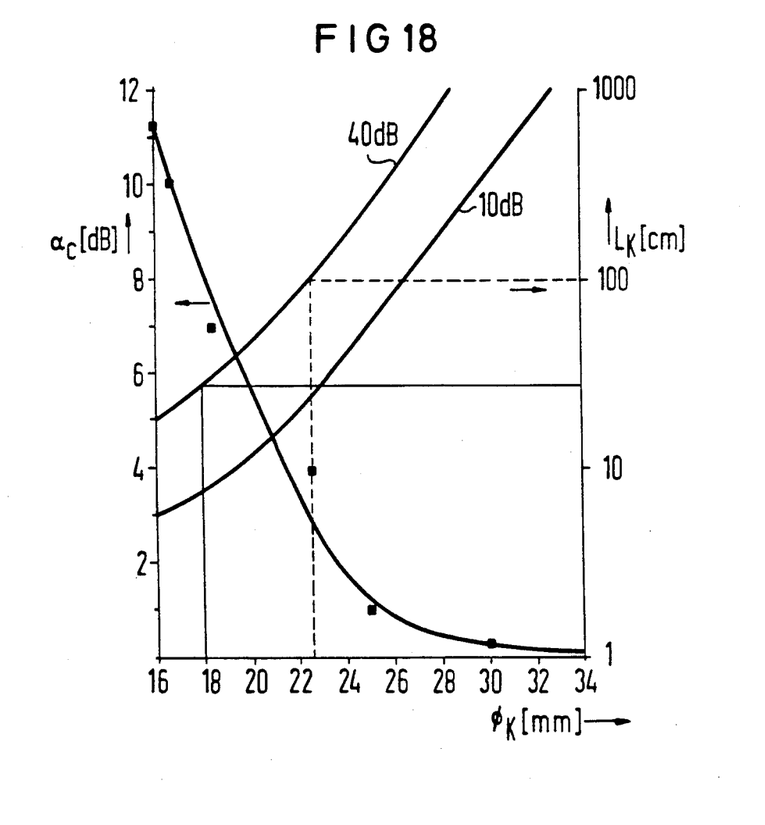
FIG. 18 is an attenuation diagram for selecting the diameter of the attenuation curvature.

The characteristic attenuation for a specific monomode optical waveguide at a specific wavelength (1275 nm) is designated by curve A in FIG. 18. As used herein the term "characteristic attenuation" means the attenuation per curvature loop with a respective curvature radius.

Curves B and C shown in FIG. 18 indicate the dependency of the waveguide curve guidance length upon the curvature diameter $\phi$ for specific attenuations (curve B: 40 dB; curve C: 10 dB).

From the corelation shown in FIG. 18, dimensioning of the radius of curvature can be selected. If, for example, a maximum curved waveguide length of one meter is selected as an upper practical boundary, a curvature diameter of approximately 23 mm results for the upper boundary of the curvature diameter.

In order to achieve as compact an apparatus as possible, small curvature diameters causing large characteristic attenuation values are of advantage. Investigations have shown, however, that wherein good reproducability of the attenuation adjustment is necessary, a lower boundary, below which the curvature cannot fall, exists. In the illustrated example, this boundary is a curvature diameter of 18 mm. This boundary generally lies at higher curvature diameters than the boundary values for mechanical loading capacity, which must also be taken into consideration.

The monomode optical fiber for which such investigations were undertaken has the following specifications:
  Core diameter: 10 micrometers
  Cladding diameter: 120 micrometers
  Refractive index difference/core/cladding: 0.003
  Cut-off wavelength: 1.225 micrometers The cut-off wavelength is the wavelength at which the transition to the dual mode fiber occurs.

In the use of other monomode optical waveguides and/or other light wavelengths, the same criteria must be taken into account in measurement of the curvature diameter as long as the optical waveguide is to be operated in a monomode range.

Figure 19:
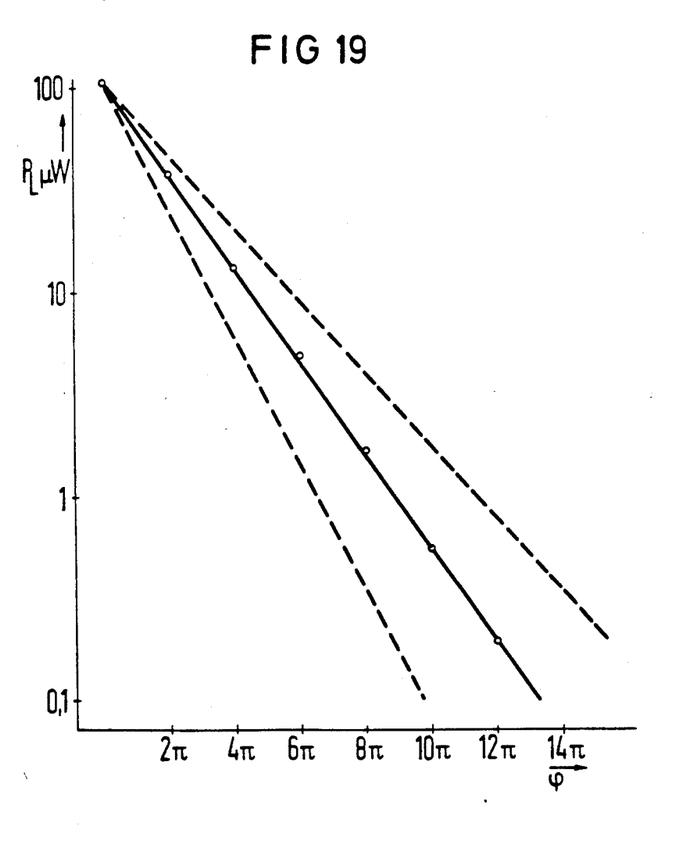
FIG. 19 is an attenuation diagram for the optical attenuator shown in FIG. 1.

The scatter or dispersion of the characteristic attenuation for various pigtails of the same fiber type is shown in FIG. 19 for the attenuator of the type depicted in FIG. 1 having a curvature diameter of 23.5 mm for various operating wavelengths. The linear corelation between the angle of rotation on the horizontal axis and the attenuation on the verticle axis is apparent.

Although modifications and changes may be suggested by those skilled in the art it is the intention of the inventors to embody within the patent warranted hereon all changes and modifications as reasonably and properly come within the scope of their contribution to the art.

We claim as our invention:

1. A method for variably attenuating a flexible monomode guide comprising the steps of:
  curving at least a portion of said waveguide about a radius of curvature for causing radiation losses as a result of said curving; and
  selectively varying the length of said portion of said waveguide subjected to said curving for selectively varying the attenuation of said waveguide.

2. A method for variably attenuating a flexible monomode optical waveguide as claimed in claim 1 wherein said step of curving is further defined by winding said portion of said waveguide around a spindle for a selected number of turns.

3. A method for variably attenuating a flexible monomode optical waveguide as claimed in claim 1 wherein said step of curving is further defined by wrapping said portion of said waveguide around at least one stationary disk.

4. A method for variably attenuating a flexible monomode optical waveguide comprising the steps of:
  curving at least a portion of said waveguide about a radius of curvature for causing radiation losses as a result of said curving; and
  selectively varying said radius of curvature about which said waveguide is curved for selectively varying the attenuation of said waveguide.

5. A method for variably attenuating a flexible monomode optical waveguide as claimed in claim 4 wherein said step of curving is further defined by displacing said portion of said waveguide from a normally straight path by engaging a circular slide with said portion of said waveguide causing the deflected portion of said waveguide to assume a curve conforming to said slide.

6. An apparatus for variably attenuating a flexible monomode optical waveguide comprising:
  means for curving at least a portion of said waveguide about a radius of curvature for causing radiation losses as a result of said curving; and means for varying the length of said portion of said waveguide curved about said radius of curvature for varying the attenuation of said waveguide.

7. An apparatus for variably attenuating a flexible monomode waveguide as claimed in claim 6 wherein said means for curving comprises:
a spindle rotably mounted on a frame; and
a means for connecting said waveguide to said spindle for winding said waveguide thereabout as said spindle is rotated.

8. An apparatus for variably attenuating a flexible monomode optical waveguide as claimed in claim 7 wherein said spindle has a right-handed set of threads and a left-handed set of threads disposed on opposite sides of said means for attaching said waveguide to said spindle, said threads respectively receiving and holding said waveguide as said spindle is rotated, and said apparatus further comprising guide means for guiding said waveguide into each of said sets of threads.

9. An apparatus for variably attenuating a flexible monomode optical waveguide as claimed in claim 8 wherein said guide means comprises two rollers forming a nip through which said waveguide passes, and wherein one of said rollers in said guide means has left-handed threads and right-handed threads disposed in substantial registry with said left-handed threads and said right-handed threads on said spindle for maintaining portions of said waveguide between said guide means and said spindle substantially parallel.

10. An apparatus for variably attenuating a flexible monomode optical waveguide as claimed in claim 6 wherein said means for curving is at least one stationary disk mounted on a base and a means for clamping said optical waveguide to said base, said waveguide wrapping said stationary disk for a selected number of turns.

11. An apparatus for variably attenuating a flexible monomode optical waveguide as claimed in claim 6 wherein said means for curving comprises:
a rectangular base having a plurality of recesses therein extending parallel to the edges of said base and a plurality of clamping means respectively disposed above each end of said recesses at the edges of said base; and
a plurality of stationary disks mounted on said base such that each disk is bounded by at least two of said recesses, said waveguide being clamped in said clamping means and extending through said recesses and wrapping a selected number of said disks for a selected number of turns.

12. An apparatus for variably attenuating a flexible monomode optical waveguide comprising:
means for curving at least a portion of said waveguide about a radius of curvature for causing radiation losses as a result of said curving; and
means for varying said radius of curvature about which said waveguide is curved for varying the attenuation of said waveguide.

13. An apparatus for variably attenuating a flexible monomode optical waveguide as claimed in claim 12 wherein said means for curving comprises:
a frame having a serpentine recess therein for receiving said waveguide; and
at least one slide and a means for laterally moving said slide on said frame, said slide carrying a disk thereon for engaging said waveguide and curving said waveguide so as to conform a selected length of said waveguide to the curvature of said serpentine recess and the curvature of said disk.

14. An apparatus for variably attenuating a flexible monomode optical waveguide as claimed in claim 13 wherein said means for laterally moving said slide is a threaded axle rotatably mounted in said frame, and wherein said slide has an interiorly threaded bore receiving said threaded axle such that rotation of said axle causes said slide to move laterally along said threaded axle.

15. An apparatus for variably attenuating a flexible monomode optical waveguide as claimed in claim 13 further comprising a return means connected to said frame for receiving and tensioning a loop of said waveguide.

16. An apparatus for variably attenuating a flexible monomode optical waveguide as claimed in claim 13 wherein said serpentine recess has a contour defined in part by a plurality of spaced rotatable disks mounted on said frame engaging said waveguide, said slide and said disk carried on said slide being laterally movable between said disks mounted on said frame.

17. An apparatus for variably attenuating a flexible monomode optical waveguide as claimed in claim 12 wherein said means for curving comprises:
a pair of guide rollers mounted on a frame and a means for normally urging said guide rollers into contact with each other; and
a deflection roller and a means mounted on said frame for moving said deflection roller between said guide rollers so as to force said guide rollers apart, said waveguide being disposed between said deflection rollers and said guide rollers and wrapping a portion of said deflection roller.

18. An apparatus for variably attenuating a flexible monomode optical waveguide as claimed in claim 12 wherein said optical waveguide transmits light having a wavelength in a range of approximately 1275 nm to approximately 1310 nm, and wherein said curvature of said waveguide has a diameter in a range of approximately 18 mm to approximately 23 mm.

* * * * *